Sept. 18, 1934.  J. MORKOVSKI  1,974,142
RELEASE HITCH FOR TRACTORS
Original Filed Jan. 14, 1931  3 Sheets-Sheet 1

Inventor.
James Morkovski,
By ...
Atty.

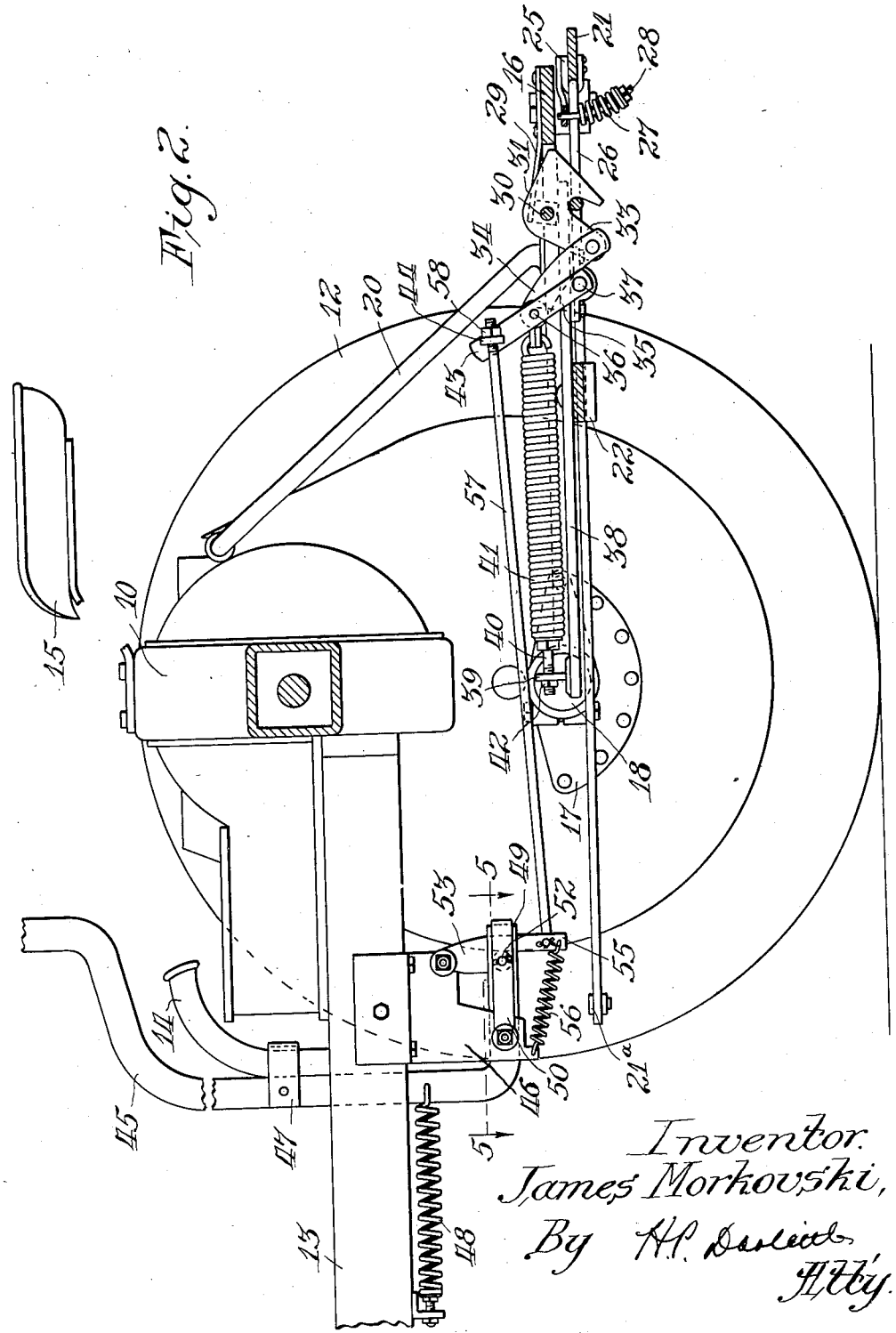

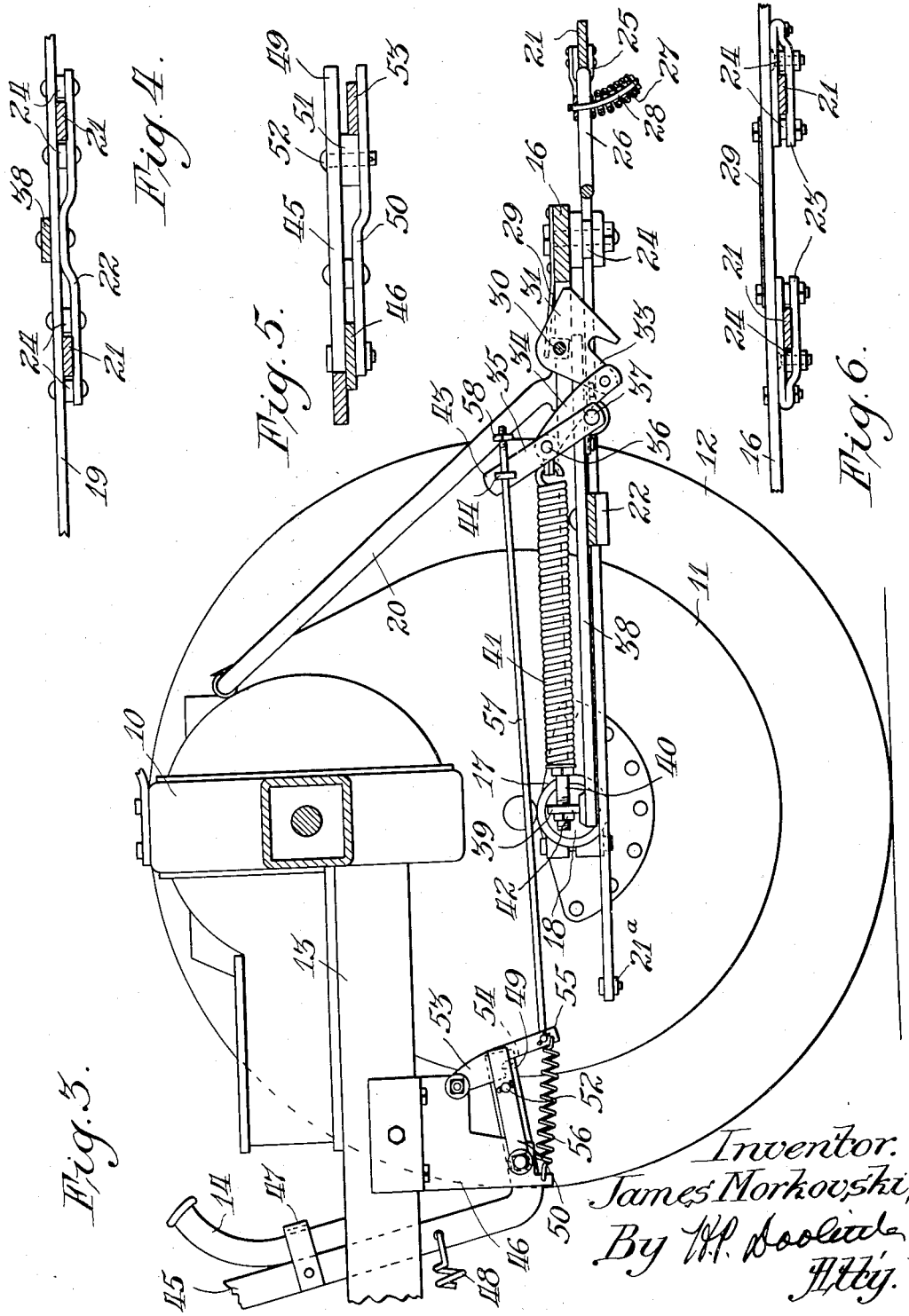

Patented Sept. 18, 1934

1,974,142

UNITED STATES PATENT OFFICE 1,974,142

RELEASE HITCH FOR TRACTORS

James Morkovski, Canton, Ill., assignor to International Harvester Company, a corporation of New Jersey Original application January 14, 1931, Serial No. 508,699. Divided and this application June 30, 1933, Serial No. 678,359.

3 Claims. (Cl. 280—33.16)

The present invention relates to draft attachments for tractors and particularly those of the safety or overload release type.

The objects of the invention are to provide a draft connection for tractors which will automatically release the implement, such as a plow, being drawn by the tractor when an obstruction is encountered by the implement, without, however, completely disconnecting the implement, and providing for return of the implement to coupled position automatically upon backing up of the tractor, the invention herein claimed being divided from application Serial No. 508,699 filed January 14, 1931 and patented November 28, 1933, No. 1,936,768.

The foregoing and other objects and advantages are attained by the organization and details of construction hereinafter described and claimed, and illustrated in the accompanying drawings, where:

Figure 2 is a longitudinal sectional view of the same from the side;

Figure 3 is a similar view with the draft mechanism in released positions;

Figure 4 is a detail sectional view on the line 4—4 of Figure 1;

Figure 5 is a similar view on the line 5—5 of Figure 2; and,

Figure 6 is a detail sectional view on line 6—6 of Figure 1.

Figure 1:
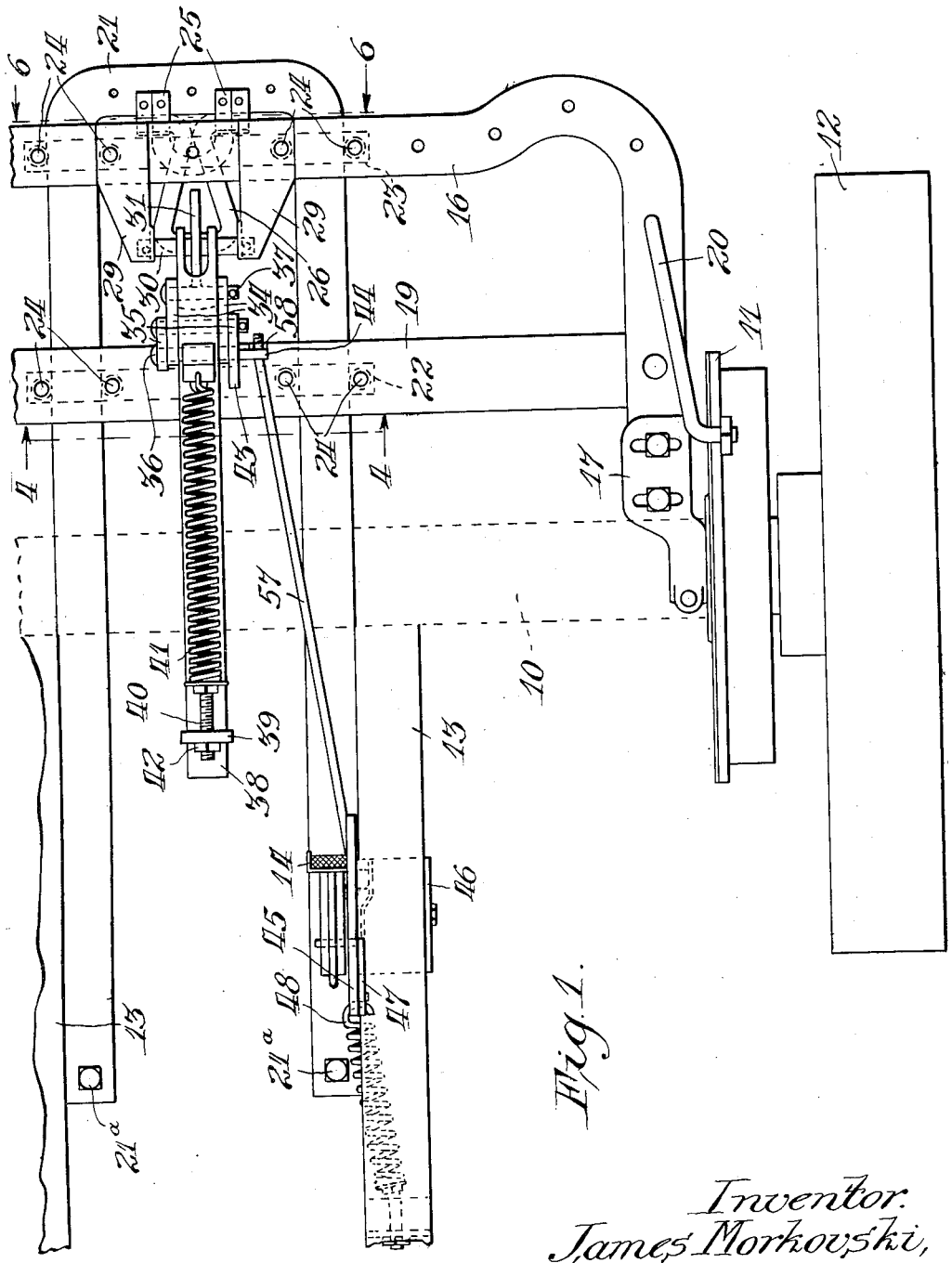
Figure 1 is a plan view of a tractor and draft device embodying the invention.

In the present instance the invention has been illustrated in combination with a tractor having a rear end structure comprising a transverse axle housing 10 and depending side housings 11, on the outer sides of which traction wheels 12 are mounted. The axle housing 10 is connected to forwardly extending side sills 13, only one of which is shown in the drawings. It will be understood that the side sills 13 are parallel and support the usual tractor power plant, etc. The tractor is provided with the usual clutch control pedal lever 14 in convenient location to the seat for the operator at 15. The tractor is provided with a rearwardly extending draft frame composed of a U-shaped member 16, the arms of which carry brackets 17 which are pivoted on trunnions 18 secured to the inner sides of the depending housings 11. Intermediate the ends of the arms of the member 16 there is secured a crossbar 19, as best seen in Figure 1. Suspension bars 20 at each side adjustably connect the draft frame to the depending housings 11.

On the draft frame above described there is slidably mounted at the center an elongated, U-shaped drawbar 21, the bight portion of which is normally located just behind the transverse portion of the member 16, and the arms of which extend forwardly under the tractor axle. The arms of the member 21 are preferably mounted on the under side of the members 16 and 19 of the draft frame by means of supporting brackets 22 and 23 secured to the under sides of said bars and spaced therefrom by suitable spacing bolts and sleeves, as at 24, in a manner to provide slideways for the arms of the drawbar 21. Stops 21$^a$ on the forward ends of the arms of drawbar 21 are adapted to contact with bracket 22 and prevent complete withdrawal of the drawbar. The inner edge of the bight portion of the drawbar 21 is provided with a pair of bearing brackets 25 which receive the outturned arms of a bail-shaped clevis member 26. This pivoted bail-shaped member is passed upwardly by means of a spring 27 carried on a curved bolt 28 mounted on the drawbar and extending below the clevis member 26. The purpose of this manner of mounting the clevis member will be hereinafter referred to. The transverse portion of the member 16 of the draft frame, at points between the arms of the drawbar 21, has secured to its upper side a pair of rearwardly extending, laterally spaced brackets 29. In the ends of this pair of brackets there is journaled a short shaft 30, to which is secured a clevis hook 31, the bill portion of which extends perpendicularly across the plane of movement of the drawbar 21. At its rear, the clevis hook 31 is formed with a downward extension 33 which is pivotally connected to an upwardly and forwardly inclined link 34 which is in turn pivoted to upwardly extending, laterally spaced, inclined links 35 by a pivot bolt 36 which connects the links 35. The lower ends of the links 35 are pivoted on a bolt 37 mounted on the under side of a longitudinally extending bar 38, which is fixedly secured to the cross member 19 of the draft frame. At its forward end, the bar 38 is provided with an upstanding lug 39, through which there is passed a screw-threaded stud or shaft 40 forming an anchoring means for a tensioning spring 41, the other end of which is connected to the bolt 36 connecting the links 34 and 35. A nut 42 on the rear side of the lug 39 and mounted on the screw-threaded shaft 40 serves to adjust the tension of spring 41. The arrangement of the clevis hooks and links, etc. above described forms a spring held toggle lock for the clevis hook 31, as will be understood from inspection of Figures 2 and 3. When a predetermined pull is applied to the bill of hook 31, the toggle formed by links 34 and 35 will be temporarily broken and the links 35 will swing rearwardly as the bill of the hook 31 turns upwardly, thereby releasing the clevis 26 and permitting the drawbar 21 to slide rearwardly in the manner illustrated by Figure 3. Upon reverse or return movement of the drawbar, the clevis 26 will be moved downwardly against the pressure of spring 27 as it rides over the bill portion 32 of hook 31 and seats in the hook. One of the links 35 is formed with an extension 43 having a laterally extending apertured lug 44, the purpose of which will be later described.

At a point adjacent the clutch controlled pedal lever 14 of the tractor and preferably below the same, there is pivoted an upright hand lever 45. This lever is preferably pivoted on a depending bracket 46 secured to the side sill 13 of the tractor so as to extend upwardly alongside of the shank portion of the clutch pedal lever 14. The upper portion of lever 45 at a point adjacent the pedal lever 14 is provided with a one-way connecting element with the pedal lever. This connection preferably consists of a rearwardly and laterally extending hook-like member 47, the laterally extending end of which constitutes a contact arm normally engaging the rear side of the pedal lever. A tension spring 48 anchored to the side sill of the tractor in advance of the lever 45 and connected to that lever above its pivot to the tractor serves to urge the lever 45 in a direction to cause clutch throw-out or release movement of both levers 45 and 14. To prevent this movement of the levers under normal operating conditions, the lever 45 is preferably formed with a rearwardly extending angular portion 49 constituting the lower arm of that lever. The portion 49 of lever 45 carries a spaced bar 50 (Figure 5), which is suitably secured to the side of the extension 49 to form a fork-like structure at the end thereof between the arms of which there is mounted a roller 51 carried on a cross pin 52. A depending latch member 53, which is pivoted at its upper end on the bracket 46, is formed with a notched shoulder 54 adapted to engage the upper edge of the roller 51 to hold the lever 45 in its inoperative or rearwardly swung position. The latch member 53 is formed with a downward extension 55 to which there is connected a forwardly extending tension spring 56, the forward end of which is anchored on the lower edge of the bracket 46. The end of the extension 55 on latch member 53 is also connected, as by means of a rearwardly extending link 57, with the lug 44 on the extension 43 of one of the toggle links 35. The connection of link 57 with lug 44 is of the lost motion type permitting the latch member 53 to remain in rearwardly swung position, as in Figure 3, after the overload release device has operated and, therefore, permitting the hand lever 45 to be restored to locked position, as in Figure 2, without affecting the release device. In the present instance, the lost motion connection referred to is effected by passing the end of the link 57 loosely through the aperture in lug 44 and providing an adjustable stop or nut 58 on the end of the link.

In the operation of the invention, the tractor will be operated with the parts in the positions shown in Figures 1 and 2 and with the implement being drawn coupled to the bight portion of the drawbar 21 in one of the openings provided. When an obstruction is encountered by the implement, the excessive pull transmitted to the clevis hook 31 will cause this hook to be oscillated in a counter-clockwise direction as the toggle lock, composed of links 34 and 35, is opened or broken. Incidentally, the links 35 and the extension 43 will be swung rearwardly on the pivot 37, causing a pull on the stop 58 on link 57 and withdrawing the latch 53 from contact with the roller 51 on the end of arm 49 of lever 45. The tension of spring 48 will cause lever 45 to be instantly swung or thrown forwardly carrying the clutch pedal lever 14 with it and effecting quick disconnection of the clutch. Should the tractor coast a foot or two, the arms of the drawbar 21 will slide rearwardly in their supports without injury to any of the parts. The operator will then shift into neutral and grasp lever 45 and pull it back against the tension of spring 48 until the latch 53 re-engages roller 51. The clutch pedal lever 14 will then be in normal position and the tractor may be backed to restore the drawbar 21 to normal position and effect re-engagement of the overload release device as heretofore described.

The construction described accordingly affords a simple and readily operated overload release mechanism well adapted for use with means for releasing the tractor clutch upon release of the implement being drawn, and also one which permits ready return of all parts to operative position. The preferred embodiment of the invention disclosed may be subject to variations within the scope of the following claims.

What is claimed is:

1. The combination with a tractor having a fixed horizontal draft frame comprising spaced cross-members, of a longitudinally extending U-shaped drawbar having its bight portion at the rear and its arms mounted on the cross-members for limited sliding movement in a fore and aft direction with respect to the draft frame, a clevis hook pivoted on the draft frame between the arms of the drawbar for movement about a transverse axis, a spring held toggle connecting the hook and draft frame and normally retaining the hook in effective position, and a yieldable clevis member mounted in the bight portion of the drawbar and positioned to interlock with the hook upon forward sliding movement of the drawbar.

2. The combination with the rear axle structure of a tractor, of a pair of superposed U-shaped draft frames one of which is fixed to the rear axle structure, supporting brackets on the fixed frame spaced in a fore and aft direction and formed with aligned openings slidably receiving the arms of the second frame, the second frame being adapted for connection of an implement thereto, a clevis hook pivoted within the fixed frame to swing vertically and positioned in the plane of the slidable frame, means on the fixed frame for yieldably retaining said hook against movement, and a clevis member on the slidable frame in position to interlock with the hook.

3. The combination with a tractor having a rearwardly extending draft frame, of supporting brackets mounted on the under side of the draft frame, a longitudinally extending U-shaped drawbar having its bight portion at the rear and its arms slidably received in said brackets for limited sliding movement in a fore and aft direction, a clevis hook pivoted on the draft frame between the arms of the drawbar for movement about a transverse axis, said hook having its bill directed downwardly across the plane of the drawbar, a spring held toggle connecting the hook and draft frame and normally retaining the hook in effective position, and a downwardly yieldable clevis member mounted in the bight portion of the drawbar and positioned to interlock with the hook upon forward sliding movement of the drawbar.

JAMES MORKOVSKI.